United States Patent [19]

Chang et al.

[11] Patent Number: 5,520,903

[45] Date of Patent: May 28, 1996

[54] METHOD OF MAKING LITHIUM METAL OXIDE CATHODE ACTIVE MATERIAL

[76] Inventors: On K. Chang, 1031 Belvedere La., San Jose, Calif. 95129; Joseph Lundquist, 1470 Longmeadow Dr., Gilroy, Calif. 95020

[21] Appl. No.: 152,770

[22] Filed: Nov. 15, 1993

[51] Int. Cl.$^6$ .................................................. C01S 31/00
[52] U.S. Cl. ......................... 423/593; 429/192; 429/194; 429/218; 429/224
[58] Field of Search .................................. 423/65, 179.5, 423/593, 641; 429/218, 192, 194, 224

[56] References Cited

U.S. PATENT DOCUMENTS

| | | |
|---|---|---|
| 3,063,795 | 11/1962 | Smith . |
| 3,063,796 | 11/1962 | Kelmers . |
| 3,728,442 | 4/1973 | Pakhomov et al. . |
| 4,061,711 | 12/1977 | Morgan et al. . |
| 4,119,707 | 10/1978 | Thome et al. . |
| 4,830,939 | 5/1989 | Lee et al. . |
| 4,879,190 | 11/1989 | Lundsgaard . |
| 4,980,251 | 12/1990 | Thackeray et al. ................. 428/224 |
| 4,990,413 | 2/1991 | Lee et al. . |
| 5,013,620 | 5/1991 | Miyazaki et al. . |
| 5,037,712 | 8/1991 | Shackle et al. . |
| 5,039,582 | 8/1991 | Pistoia ...................................... 429/218 |
| 5,264,201 | 11/1993 | Dahn et al. .............................. 423/594 |
| 5,316,877 | 5/1994 | Thackeray et al. ..................... 429/197 |
| 5,326,545 | 7/1994 | Koksbang et al. ....................... 423/62 |
| 5,336,572 | 8/1994 | Koksbang ................................ 429/218 |

Primary Examiner—M. Nuzzolillo

[57] ABSTRACT

A method of making a composition having lithium, transition metal and oxygen elements and preferably having vanadium as the transition metal with a unit structure of the nominal general formula $LiV_3O_8$, such structure being able to accept lithium ions. The method as exemplified by the formation of $Li_{1+x}V_3O_8$ ($0 \leq x \leq 0.2$) comprises forming a mixture of intermingled particles of vanadium pentoxide ($V_2O_5$) and lithium carbonate ($Li_2CO_3$) each in an amount sufficient to provide a stoichiometric ratio of approximately 1:3 of lithium to vanadium respectively; compacting the particles by applying a compressive force to the intermingled particles; and heating the intermingled particles to an elevated temperature which is below the melting point of the $LiV_3O_8$ product of the invention. The compacting and heating steps consolidate the particles into a densified body and cause diffusion of at least a portion of the elements across particle boundaries with release of carbon dioxide, thereby providing a lithium-vanadium-oxygen composition having a unit structure of $Li_{1+x}V_3O_8$.

17 Claims, 3 Drawing Sheets

1

METHOD OF MAKING LITHIUM METAL OXIDE CATHODE ACTIVE MATERIAL

FIELD OF THE INVENTION

This invention relates to a method of making cathode active material and cathodes for electric current producing and storage cells and more particularly to a lithium metal oxide obtained through a new process of synthesis.

BACKGROUND OF THE INVENTION

Lithium-based cells or batteries often comprise cathodes of transition metal oxides which are used as intercalation compounds. The intercalation reaction involves the interstitial introduction of a guest species, namely, lithium into the host lattice of the transition metal oxide, essentially without structural modification of the host lattice. Such intercalation reaction is essentially reversible because suitable transition states are achieved for both the forward and reverse of the intercalation reaction.

The basic components of a lithium cell typically include a lithium anode, a separator, and a metal oxide intercalation cathode active material such as a vanadium oxide compound. The cathode is usually a mixture of such oxide compound and other components such as graphite and an electrolyte/binder which provide ionic transport. During cell operation, incorporation of lithium in the metal oxide occurs. Examples of lithium metal oxides include lithium vanadium oxide ($LiV_3O_8$) and lithium manganese oxide ($LiMnO_2$). Lithium vanadium oxide is particularly favored. U.S. Pat. No. 5,013,620 describes a process for forming a lithium vanadium oxide compound by mixing precursor components containing lithium with vanadium pentoxide and then baking the mixture to a temperature in the range of about 700° C. (centigrade) to 800° C. to cause formation of $LiV_3O_8$. The molten $LiV_3O_8$ is then cooled and ground up into a powder. The melt process has certain disadvantages because it is difficult to handle molten metal oxides at high temperatures and special procedures are required. In addition, there is a reaction between the molten $LiV_3O_8$ and most containers used for conducting the reaction which thereby causes contamination of the product. In addition, a significant amount of mechanical energy is required to grind the cooled, solidified $LiV_3O_8$ product into a powder for inclusion in a cathode composition of an electrochemical cell. Despite these difficulties, typical melt processes, as described in U.S. Pat. No. 5,013,620, continue to be used to obtain positive electrode active material. Therefore, what is needed is a new process for preparing lithium metal oxide which is economical, which does not require handling metal oxide constituents in a molten state and which achieves good conversion of the starting materials to the final lithium metal oxide product.

SUMMARY OF THE INVENTION

In a preferred method, a lithium metal oxide composition is prepared having a unit structure characterized by the ability to insert lithium in an electrochemical reaction. Such compounds are referred to as intercalation compounds and they are transition metal chalcogen compounds having a reversible lithium insertion ability. It is preferred that the transition metal is one or more selected from the group consisting of V, Co, Mn, and Ni. The chalcogen compound is oxygen. These compounds may be represented by the general formula $Li_xZ_yO_a$ where Z represents a transition metal, and x, y and a are each greater than or equal to one.

Particularly suitable oxide compounds favored for use as positive electrode active materials are $LiV_3O_8$, $LiMnO_2$, $LiCoO_2$ and $LiNiO_2$.

In the case of transition metals (Tm) nickel, cobalt and manganese, the general formula of the synthesized active material is $Li_xTm_yO_z$ where $0.9 \leq x \leq 1.1$, y=1 and $1.9 \leq z \leq 2.05$. In the case of the lithiated vanadium oxide, the formula of the synthesized product is $Li_xV_yO_z$ where $1 \leq x \leq 1.2$, y=3 and $8 \leq z \leq 8.1$.

The process of the invention will be described with reference to the preparation of an active material having the nominal general stoichiometric formula $Li_{1+x}V_3O_8$, where $0 \leq x \leq 0.2$ as synthesized, and which is a reversible cathode for lithium based electrochemical cells having good energy, power and cycling capability. The $Li_{1+x}V_3O_8$ is also able to accept up to 3 moles of lithium during discharge resulting in $Li_4V_3O_8$ nominal general formula. The $LiV_3O_8$ is prepared in a solid state synthesis process which lithiates a precursor metal oxide such as $V_2O_5$ in a solid state synthesis reaction between intermingled particles of a lithium-containing compound and the metal oxide. The lithium-containing compound is lithium carbonate ($Li_2CO_3$) or lithium hydroxide (LiOH). The solid state process is conducted by a sequence of steps, the first being forming a mixture comprising the intermingled particles of the metal oxide and the lithium compound each in an amount sufficient to provide a stoichiometric amount of the lithium and the metal of the oxide in the final product. In the case of the preparation of $LiV_3O_8$, the overall reaction may be represented as follows: $Li_2CO_3 + 3V_2O_5 = 2LiV_3O_8 + CO_2$. As can be seen, the stoichiometric ratio of lithium and vanadium in the reactants is 1:3 of Li:V. This corresponds to one mole equivalent of lithium carbonate for each 3 mole equivalent of vanadium pentoxide. It is preferred that an excess amount of the lithium compound be used. The particles are blended together and then compacted to form a densified body or pelletized powder. The compacted particles are densified to the point where their bulk density, after blending, on the basis of grams per milliliter is at least doubled desirably tripled and preferably the bulk density is increased by a factor of 4. The extent of compacting is also expressed as a percent of theoretical compact density, where 100% corresponds to the density of the $Li_2CO_3/V_2O_5$ mix with no pores or air present. The compacting achieves at least 50% of theoretical compact density, desirably 60% and preferably 70%. After intermingling and compacting, the densified particles are heated to an elevated temperature which is below the melting point of the final lithium metal oxide product. The $LiV_3O_8$ product has a melting point of about 620° C. Desirably, the temperature is less than 600° C. and it is preferred that the temperature be even lower, that is, no higher than about 585° C. Lithium manganese oxide ($LiMnO_2$) has a melting point of 1200° C. In this case desirably the temperature is less than 1100° C. and it is preferred to be lower than 1000° C.

The particles are compacted by applying a force of pressure to a free surface of the intermingled particles in a press at a pressure of at least about 3,000 psi which is equivalent to about 200 bar of compressive force. It is preferred that the compressive force is on the order of 14,400 psi, 1000 kg/cm$^2$, or 980 bar.

When the compacted particles are heated to an elevated temperature, diffusion of at least a portion of the elements, being one or more of transition metal (i.e. vanadium), lithium and oxygen, occurs across particle boundaries and release of effluent oxygen containing gas, (i.e. carbon dioxide) also occurs. The diffusion of one or more elements across particle boundaries causes at least partial homogenization or blending of such elements and concomitant release of effluent gas which provides a lithium-metal-oxygen composition. In the case of lithium-vanadium-oxygen, such composition has a unit structure represented by the nominal general formula $Li_{1+x}V_3O_8$, where $0 \leq x \leq 0.2$, as synthesized.

It is an object of the invention to provide a new method for preparing a lithium metal oxide positive electrode active material for a lithium battery. Another object is to provide a lithium battery having good charge and discharge capacity. Another object is to provide an improved electrochemical battery based on lithium which maintains its integrity over prolonged life cycle as compared to presently used batteries. Another object is to provide lithium vanadium oxide active material having a relatively low amount of precursor materials and contaminates whereby the composition approaches 100% by weight $Li_{1+x}V_3O_8$. Another object is to provide good conversion of the starting materials to the lithium-metal-oxide product.

These and other objects, features and advantages will become apparent from the following description of the preferred embodiments, appended claims and accompanying drawings.

DETAILED DESCRIPTION OF THE PREFERRED EMBODIMENTS

Figure 1:
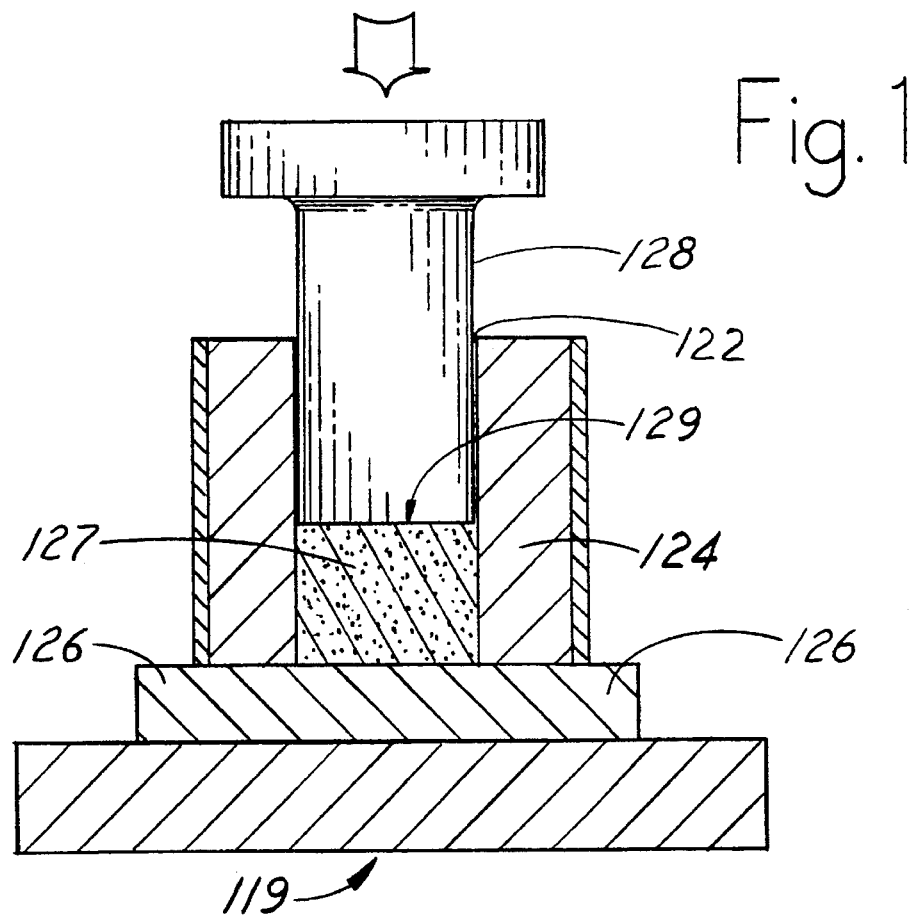
FIG. 1 is an apparatus used in the method of the invention.

In a preferred method, a lithium metal oxide composition is prepared having a unit structure characterized by the ability to insert lithium in an electrochemical reaction. A particularly preferred lithium-vanadium-oxide composition is prepared having a unit structure of the nominal general formula $LiV_3O_8$, also represented by the nominal general formula $Li_{1+x}V_3O_8$ which is a reversible cathode for lithium based electrochemical cells. Other compositions include $LiMnO_2$, $LiCoO_2$ and $LiNiO_2$. Such compositions are able to insert lithium in and release it from the basic structure with good energy, power and cycling capability. The method of the invention will first be described with reference to the preparation of $LiV_3O_8$ from lithium carbonate and vanadium pentoxide.

The $LiV_3O_8$ is prepared in a solid state synthesis process which lithiates a metal oxide in a solid phase reaction between intermingled particles of lithium carbonate ($Li_2CO_3$) and vanadium pentoxide ($V_2O_5$). The solid state process begins with forming a mixture comprising intermingled particles of vanadium pentoxide and lithium carbonate, each in an amount sufficient to provide approximately a stoichiometric amount of lithium and vanadium elements in the final product. The overall reaction may be represented as follows: $Li_2CO_3+3V_2O_5=2LiV_3O_8+CO_2$. As can be seen, the stoichiometric ratio of lithium and vanadium in the reactants is 1:3 of Li:V. This corresponds to one mole equivalent of lithium carbonate for each 3-mole equivalent of vanadium pentoxide. It is preferred that an excess amount of lithium carbonate be present corresponding to 5% excess $Li_2CO_3$, or 1.05 moles of lithium carbonate for every three moles of vanadium pentoxide. The particles are blended together and then compacted to densify them forming a densified body or pelletized powder. The compacted particles are densified to the point where their bulk density, after densifying is at least 50%, desirably 60% and preferably 70% of the theoretical compacted density. The density of the $Li_2CO_3/V_2O_5$ mix with all of the air squeezed out is about 3.13 g/cm³. A pellet density of 2.2 g/cm³ corresponds to 73% theoretical density. After intermingling and compacting, the densified particles are heated to an elevated temperature which is below the melting point of $LiV_3O_8$. The $LiV_3O_8$ has a melting point of about 620° C. Desirably, the temperature is less than 600° C. and it is preferred that the temperature be even lower, that is, no higher than about 585° C. Conveniently, the compacted pellets are removed from the press prior to heating. The more complex process of hot pressing is not required to achieve good results, although it is within the scope of the invention.

It is preferred that the particles be compacted by applying a force of pressure to a free surface of the intermingled particles by compacting them in a press at a pressure of at least about 3000 psi which is equivalent to about 200 bar of compressive force.

When the compacted particles are heated to an elevated temperature, diffusion of at least a portion of the elements, being one or more of vanadium, lithium and oxygen, occurs across particle boundaries and release of carbon dioxide also occurs. The diffusion of one or more elements across particle boundaries causes at least partial homogenization or blending of such elements and concomitant release of carbon dioxide which provides a lithium-vanadium-oxygen composition having a unit structure represented by the nominal general formula $Li_{1+x}V_3O_8$. The carbon dioxide is released as an effluent gas and leaves the solid product. A few parts per million (ppm) of carbon monoxide may also be present in the effluent.

While not wishing to be held to any particular theory, it is thought that the process of the invention encourages diffusion particularly of lithium across vanadium pentoxide particle boundaries thus providing a lithiated metal oxide having a basic structure represented by the nominal general formula $LiV_3O_8$. The solid state synthesis of lithiated vanadium oxide according to the invention provides conversion of over 80% and in the range of 90% to 100% of the vanadium pentoxide to lithiated vanadium oxide. In the solid state process of the invention, it is typical to achieve conversion of 95% to 100% of the vanadium pentoxide to a unit structure represented by the nominal general formula $LiV_3O_8$. It is thought that some sintering may occur, however, the process relies upon chemical reaction between solid particles and not sintering to achieve the result.

It is thought that high conversion of vanadium pentoxide and excellent diffusion of lithium across particle boundary lines is, at least in part, a result of combining proper particle size of the starting material, namely, lithium carbonate and vanadium pentoxide, along with compacting of the particles to enhance such diffusion of lithium across particle boundaries.

The average particle size, which is the specific volume average particle size, of lithium carbonate and vanadium pentoxide is less than ten microns and preferably only a few microns or less. Desirably, the particles are one micron and preferably of submicron size, on the order of 0.5 microns. This particle size is achievable by grinding the lithium carbonate and vanadium pentoxide powders together. The bulk density of the intermingled powders after grinding but before compacting is on the order of 0.5 to 0.7 grams per milliliter. This is equivalent to each gram of such powder occupying between 1.42 milliliters and 2 milliliters. The bulk density of the compacted powder, which is in the form of pellets or a densified body is on the order of 2 to 2.5 grams per milliliter. This is equivalent to each gram of such densified body occupying a volume on the order of 0.4 milliliter to 0.5 milliliter. Accordingly, it can be seen that the process of compacting or densification results in the bulk density of the powder increasing by a factor in a range of 2 to 5.

It has been found that good results are achieved when the compacted powder is heated in an oven for about 30 minutes at about 580° C. to 585° C. Suitable times and temperature ranges for the heating are thought to be 15 to 120 minutes and 570° to 600° C. Although there does not appear to be an upper limit on the amount of time for proper heating, more than 30 minutes is thought to be unnecessary. It is thought that a minimum heating time of at least about 15 minutes is necessary to achieve suitable results. It is thought that a minimum temperature of about 570° C. is needed to achieve acceptable results. An excess of the lithium-containing compound on the order of 5% facilitates the reaction, when the excess approached 20%, there was no significant difference in performance.

EXAMPLE

Lithiated vanadium oxide was synthesized in a solid state reaction having the overall general formula $Li_2CO_3 + 3V_2O_5 = 2LiV_3O_8 + CO_2$. Powder of lithium carbonate of a 99.997% purity was obtained from Aldrich Chemical Co., Inc. of Milwaukee, Wis. The material was in particle form, had a melting point of approximately 618° C., a specific gravity of approximately 2.1 grams per cc, a particle size of less than 200 mesh (about 70 microns) and had the appearance of a white powder. The chemical abstract (CAS) number for lithium carbonate is 554-13-2 and its synonyms are camcolit, carbonic acid dilithium salt, candamide, carbonic acid lithium salt and dilithium carbonate.

Vanadium pentoxide of the general formula $V_2O_5$ was obtained from Kerr McGee, Johnson Matthey or Alpha Products of Danvers, Mass. It had a melting point of about 690° C., decomposed at 1750° C., a particle size of less than about 60 mesh (250 microns) and had a specific gravity of 3.357 grams per cc at 18° C. It was a yellow to red crystalline powder. Vanadium pentoxide has a CAS number of 1314-62-1.

Alternatively, the vanadium pentoxide may be prepared from ammonium metavanadate ($NH_4VO_3$). The ammonium metavanadate is heated to a temperature of about 400° C. to about 450° C. to decompose it to vanadium pentoxide ($V_2O_5$), usually in a crystalline form (in the presence of oxygen). The ammonium metavanadate is a solid crystalline material, usually a white to yellow powder. Processes for production of ammonium metavanadate are known in the art and will not be repeated here. Such processes are described in U.S. Pat. Nos. 3,063,795 and 3,063,796; and processes for preparation of ammonium metavanadate and then for production of vanadium pentoxide therefrom are described in U.S. Pat. Nos. 3,728,442, 4,061,711 and 4,119,707, each of which is incorporated herein by reference in its entirety.

The lithium carbonate and vanadium pentoxide were mixed together in a proportion to provide approximately a stoichiometric amount of lithium and vanadium elements where the stoichiometric amount is equivalent to b 1:3 1 of Li:V. An excess amount of lithium carbonate was used equivalent to about 5% excess, which is 1.05:3 of Li:V. The molecular weight of lithium carbonate is approximately 74 grams per mole and the molecular weight of vanadium pentoxide is approximately 182 grams per mole. Three moles of vanadium pentoxide is equivalent to approximately 546 grams. The 5% excess of lithium carbonate corresponded to using 1.05 times 74 grams per mole of lithium carbonate which is equal to approximately 78 grams of lithium carbonate for every 546 grams of vanadium pentoxide. The weight ratio of lithium to vanadium pentoxide was calculated to be approximately 1:7 (i.e. 546÷78=7).

In this example, approximately 250 grams of the lithium carbonate and vanadium pentoxide blend was used in the ratio described above. The mixed powder was blended and comminuted to reduce particle size in a Sears Kenmore 14-speed blender at the highest speed for 15 seconds with tumbling motion. A sample was taken and then the powder was blended for another 15 seconds and a second sample was taken. Altogether eight samples were prepared with respective blending times of 15 or 30 seconds, and some of the samples were pressed into a densified pellet. Other samples were not pressed and were used for comparison purposes. Each sample was of a 1.0 gram size. Some samples were heated for approximately 30 minutes and others for approximately 60 minutes as shown in Table 1. All samples were heated to a temperature of about 580° C. to 585° C. Those samples which were pressed were heated after pressing.

Those samples which were pressed, were pressed in an apparatus 119 as shown in FIG. 1. Each of the 1 gram samples 127 to be pressed was placed in a cylindrical cavity 122 of an open top die 124 resting on a base element 126. A charge of mixed powder 127 was placed into the cavity 122 and rested on base element 126. A hydraulically driven punch 128 was advanced into cavity 122 to apply a pressure of about 14,400 psi, (1,000 kg (kilogram) per $cm^2$ (square centimeter), 980 bar) to a free surface 129 of the powder charge 127 for two minutes to compress or densify the powder 127.

The cross sectional area of the hydraulically driven punch 128 was approximately 0.894 $cm^2$ and was in the form of a copper piston. The charge 127 to the press was usually on the order of 1 gram±0.05 grams of powder. The pressure was usually maintained at about 430 bar for about five minutes.

TABLE 1

| SAMPLE | GRINDING/ BLENDING TIME (sec) | PRESSED? | HEATING TIME (min) |
|---|---|---|---|
| 1 | 15 | NO | 30 |
| 2 | 30 | NO | 30 |
| 3 | 15 | YES | 30 |
| 4 | 30 | YES | 30 |
| 5 | 15 | NO | 60 |
| 6 | 30 | NO | 60 |
| 7 | 15 | YES | 60 |
| 8 | 30 | YES | 60 |

TABLE 2

| SAMPLES | $V_2O_5$ WEIGHT % | BLENDING TIME/(sec) | PRESSED? |
|---|---|---|---|
| 1 | 34.3 | 15 | NO |
| 2 | 15.6 | 30 | NO |
| 3 | 1.8 | 15 | YES |
| 4 | 1.9 | 30 | YES |

The $V_2O_5$ content of the samples prepared in accordance with the method of invention, namely samples 3 and 4, were compared to comparison samples 1 and 2 as shown in Table 2. Of particular importance is the vanadium pentoxide weight content of each of the samples. The data in Table 2 clearly show that pressing the blended powder is exceptionally effective in making the reaction more complete. By pressing the powder mix, the content of $V_2O_5$ was reduced from unacceptable levels, greater than 10% and ranging up to over 30%, to acceptable levels less than 10% and as low as 2% or less.

The vanadium pentoxide content of each of the samples was analyzed by x-ray diffraction using an internal standard.

Figure 2:
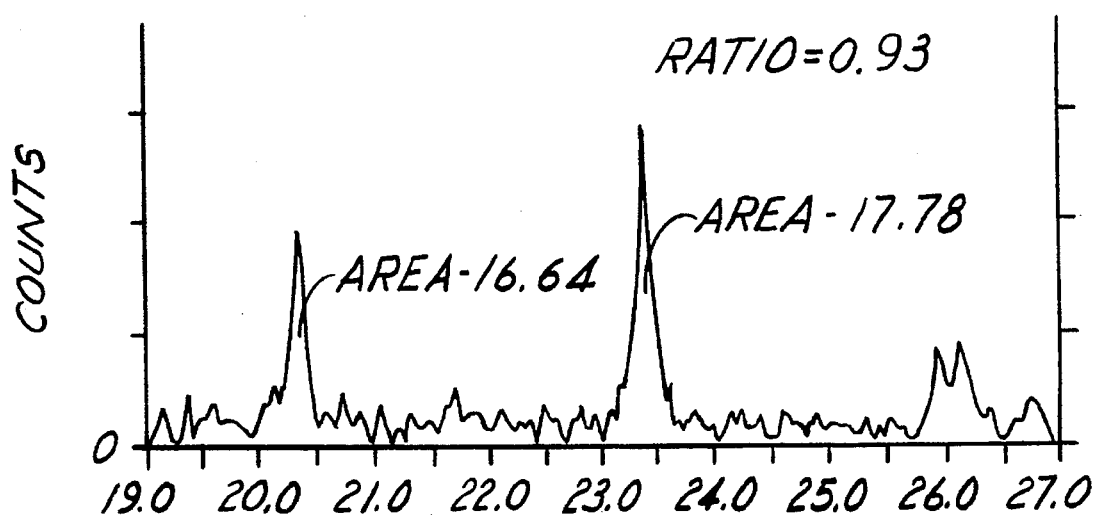
FIGS. 2 and 3 are x-ray diffractograms with the peak near 20° being due to the presence of any unconverted $V_2O_5$ metal oxide precursor and the peak near 23° being due to the preferred lithium metal oxide product, $LiV_3O_8$.
Figure 3:
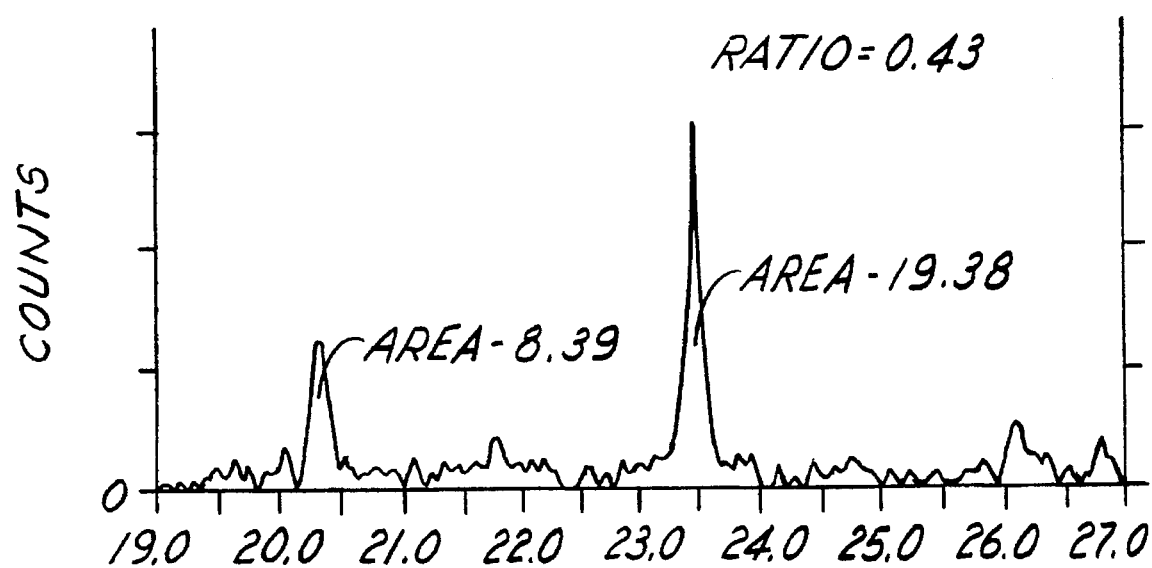

Shown in FIGS. 2 and 3 are two x-ray diffractograms. The peak near 20° is due to $V_2O_5$ and the peak near 23° is due to $LiV_3O_8$.

For a mixture of $V_2O_5$ and $LiV_3O_8$:
let x=weight % of $V_2O_5$
100−x=weight % of $LiV_3O_8$ The weight % ratio $(V_2O_5)/(LiV_3O_8) = x/(100-x)$. The amount of a component is proportional to the peak area. So the peak area ratio r is proportional to the weight % ratio. i.e $$r = K \frac{x}{100 - x}$$

where K is the proportional constant. Rearranging the above equation gives:

$$x = \frac{100r}{K + r}$$

This equation can be used to find x(weight % $V_2O_5$) from r (peak area ratio). The value of K can be determined from the diffractogram of a mixture with known amount of $LiV_3O_8$ and $V_2O_5$.

In the case where LiOH is used in the solid state process, it is obtained in powder form of essentially colorless crystals with a specific gravity of about 2.54, particle size of less than 40 mesh (350 microns) and with a melting point of about 462° C. The basic reaction of the process is:

2 LiOH+3 $V_2O_5 \rightarrow$ 2 $LiV_3O_8+H_2O$. In this case, the oxygen containing effluent gas is water vapor.

The process of the invention is used to form other lithium metal oxide active material compounds as in the following general formulas. In the case of manganese the preferred reaction is:

4 LiOH+4 $MnO_2 \rightarrow$ 4 $LiMnO_2$+2 $H_2O_2$

The manganese dioxide is a black powder, available with a specific gravity of 5.0 and decomposes at about 535° C.

In the case of other lithium metal oxides the reactions may be generalized to $O_2$+2 $Li_2CO_3$+4 MO$\rightarrow$4 $LiMO_2$+2 $CO_2$, where M is Co or Ni. There is a basic difference between these reactions and the reaction for the preparation of $LiV_3O_8$. In the preparation of $LiV_3O_8$, the oxidation state of V does not change in the reaction. Whereas the oxidation states of Mn, Co or Ni change in the reactions above. The techniques of the invention are most appropriate for the V and Mn, as they do not require $O_2$ from the atmosphere to participate in the reaction. Pressing the powder mixture into a pellet limits the availability of $O_2$ for the reaction. There is also a fundamental difference between $LiV_3O_8$ and the other three lithiated metal oxides as positive electrode material for lithium batteries. $LiV_3O_8$ as synthesized is in the charged form. During the discharge of the cell, more lithium intercalates into the crystal of $LiV_3O_8$ according to the reaction:

$$LiV_3O_8 + x\ Li^+ + x\ e^- \rightarrow Li_{1+x}V_3O_8$$

$LiMnO_2$, $LiCoO_2$ and $LiNiO_2$ as synthesized are in the discharged form. During the charge of the cell, some lithium is removed from the crystal according to the reaction: $LiMO_2 \rightarrow Li_{1-x}MO_2 + x\ Li^+ + xe^-$; where M is Mn, Co or Ni.

PREPARATION OF CATHODE AND CELL

Figure 4:
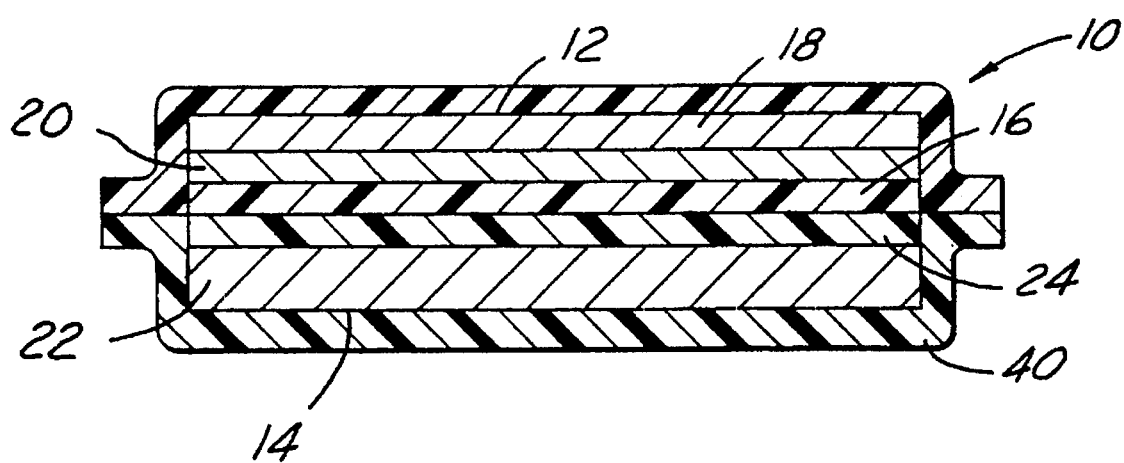
FIG. 4 is an illustration of a cross-section of a thin battery or cell embodying the invention.

The cathode active material of the invention is used to prepare cathodes for lithium based electrochemical cells. FIG. 4 shows an electrochemical cell or battery 10 which has a negative electrode side 12, a positive electrode side 14, and a separator 16 there-between. In accordance with common usage, a battery may consist of one cell or multiple cells. The negative electrode is the anode during discharge, and the positive electrode is the cathode during discharge. The negative electrode side includes current collector 18, typically of nickel, iron, stainless steel, and/or copper foil, and a body of negative electrode material 20. The negative electrode material 20 is sometimes simply referred to as the negative electrode or negative electrode composition. The negative electrode side 12 may consist of only a metallic electrode 20 without a separately distinguishable current collector 18. The positive electrode side 14 includes current collector 22, typically of aluminum, nickel, iron, stainless steel, and/or copper foil, or such foils having a protective conducting coating foil, and a body of positive electrode material 24. The cathode composition 24 has a typical composition as set forth in Table 3 and includes the $LiV_3O_8$ of the invention as the active material. The positive electrode material 24 is sometimes simply referred to as the positive electrode or positive electrode composition. The separator 16 is typically a solid electrolyte, electrolyte separator. Suitable electrolyte separators (polymer electrolyte) are described in U.S. Pat. Nos. 4,830,939, 4,990,413, and 5,037, 712, each of which is incorporated herein by reference in its entirety. The electrolyte separator is a solid organic polymer matrix containing an ionically conducting powder or liquid with an alkali metal salt and the liquid is an aprotic polar solvent. Cell 10 also includes a protective covering (40) which functions to prevent water and air from contacting the reactive layers of the cell 10.

Cell 10 is preferably a laminar thin cell type including a lithium anode (negative electrode 20). Laminar thin-cell batteries containing lithium anodes are known in the art, and it will be appreciated that the cell can include various constructions such as bi-faced or bi-polar cell designs. Examples of cell constructions include a "jelly roll" or a fan folded laminate strip design as described in U.S. Pat. No. 4,879,190 incorporated herein by reference in its entirety.

Because the cell utilizes a lithium anode layer 20, it is necessary to manufacture the cell in a water (humidity) free environment. Lithium is extremely reactive with water and if reacted, a passivation layer can form on the surface of the anode layer, reducing the efficiency of the layer, and increasing cell impedance. Accordingly, it is particularly desirable to manufacture the cell in an environment having a relative humidity at room temperature of less than 2% (less than 300 ppm water). An environment containing between 1 ppm and 50 ppm water, and preferably less than 1 or 2 ppm water, produces a particularly efficient cell.

TABLE 3

| TYPICAL CATHODE COMPOSITION | PERCENT WEIGHT |
|---|---|
| Active Material (LiV$_3$O$_8$) | 45.0 |
| Carbon | 10.0 |
| Propylene Carbonate (PC) | 33.0 |
| PolyEthylene Oxide (PEO) | 1.0 |
| PolyEthyleneGlycolDiAcrylate (PEGDA) | 9.0 |
| TriMethylPolyEthylene Oxide TriAcrylate (TMPEOTA) | 2.0 |

The cathode composition containing the Li$_{1+x}$V$_3$O$_8$ active material of the invention is coated onto nickel foil, followed by electron beam curing (crosslinking/polymerization) of the acrylate component. Then the electrolyte is coated on top of the cathode and cured with ultraviolet light. The lithium electrode is applied on top of the electrolyte separator and the battery is finally placed in a flexible pouch 40 which is heat sealed under vacuum.

The invention provides a lithium vanadium oxide compound of the general formula Li$_{1+x}$V$_3$O$_8$ having high purity, low V$_2$O$_5$ content, and good energy, power and cycling capability. The process of the invention is efficient and readily adaptable to continuous production of large quantities of active material in a manufacturing setting.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

We claim:

1. A method of making a composition having the elements lithium, vanadium and oxygen and a unit structure corresponding to the nominal general formula LiV$_3$O$_8$, such structure able to accept lithium ions, comprising:
   a. forming a mixture comprising intermingled particles of vanadium pentoxide (V$_2$O$_5$) and lithium carbonate (Li$_2$CO$_3$) each in an amount sufficient to provide a stoichiometric ratio of approximately 1:3 of lithium to vanadium respectively;
   b. compacting the particles by applying a compressive force to the intermingled particles; and
   c. heating the intermingled particles to an elevated temperature which is below the melting point of LiV$_3$O$_8$; the pressure and temperature each sufficient to consolidate the particles into a densified body and to cause a diffusion of one or more of the lithium, vanadium and oxygen elements across particle boundaries and a release of carbon dioxide thereby providing a lithium-vanadium-oxygen composition having a unit structure represented by the nominal general formula LiV$_3$O$_8$.

2. The method according to claim 1 wherein the step of compacting is accomplished by applying a force of pressure of at least about 3000 psi to a free surface of the intermingled particles.

3. The method according to claim 1 wherein the particles have an average size less than about 10 microns.

4. The method according to claim 3 wherein the particles have a size of less than about 1 micron.

5. The method according to claim 4 wherein the particles have an average size of about 0.5 microns.

6. The method according to claim 1 wherein the mixture of intermingled particles has a bulk density of about 0.5 to about 0.7 grams per milliliter before compacting.

7. The method according to claim 6 wherein the mixture of intermingled particles has a bulk density of about 2.0 to 2.5 grams per milliliter after compacting.

8. The method according to claim 1 wherein the compacted particles are heated to a temperature of about 580° C. to about 585° C.

9. The method according to claim 8 wherein the heating of the mixture occurs for at least 15 minutes.

10. The method according to claim 9 wherein the heating of the mixture occurs for between about 15 minutes and about 30 minutes.

11. A method of making a material comprising, pressing and heating intermingled particles of a transition metal oxide, and a lithium-containing compound selected from the group consisting of lithium carbonate; lithium hydroxide and mixtures thereof, such particles having an average size of about 10 microns or less; and reacting such particles in a solid phase reaction by transporting lithium and optionally other elements of said intermingled particles across particle boundaries and releasing an oxygen-containing gas from the particles whereby at least partial homogenziation across such boundaries produces a solid phase having a unit structure consisting of lithium; transition metal and oxygen elements, where the heating is at a temperature below the melting point of the solid phase product, and wherein the pressing is conducted before the heating.

12. The method according to claim 11 wherein the heating is conducted at a temperature of about 400° C. to 1000° C.

13. The method according to claim 11 wherein the particles have an average size in a range of about 0.5 to about 10 microns.

14. A method of making a material comprising, pressing and heating intermingled particles of a transition metal oxide, and a lithium-containing compound selected from the group consisting of lithium carbonate, lithium hydroxide and mixtures thereof, such particles having an average size of about 10 microns or less, and reacting such particles in a solid phase reaction by transporting lithium and optionally other elements of said intermingled particles across particle boundaries and releasing an oxygen-containing gas from the particles whereby at least partial homogenization across such boundaries produces a solid phase having a unit structure consisting of lithium, transition metal and oxygen elements, where the heating is at a temperature below the melting point of the solid phase product, and wherein the mixture of intermingled particles has a bulk density of at least about 50% of theoretical compact density after compacting.

15. A method of making a composition suitable for use as an electrode active material, comprising pressing and heating intermingled particles of manganese oxide and lithium hydroxide, such particles having an average size of about 10 microns or less, and reacting such particles in a solid phase reaction by transporting lithium and optionally other elements of said intermingled particles across particle boundaries and releasing oxygen and water from the particles whereby at least partial homogenization across such boundaries produces a solid phase having a unit structure consisting of lithium, manganese, and oxygen elements, where the heating is at a temperature below the melting point of the solid phase product, and the solid phase reaction is conducted according to the general reaction:

$$4LiOH + 8MnO_2 = 4LiMn_2O_4 + 2H_2O + O_2.$$

16. A method of making a composition suitable for use as an electrode active material comprising, pressing and heating intermingled particles of a vanadium oxide and lithium hydroxide, such particles having an average size of about 10 microns or less, and reacting such particles in a solid phase reaction by transporting lithium and optionally other elements of said intermingled particles across particle boundaries and releasing water and oxygen from the particles whereby at least partial homogenization across such boundaries produces a solid phase having a unit structure consisting of lithium, vanadium, and oxygen elements, where the heating is at a temperature below the melting point of the solid phase product, and wherein the solid phase reaction is conducted according to the general reaction:

$$2LiOH + 3V_2O_5 = 2LiV_3O_8 + H_2O.$$

17. The method according to claim 11 wherein the pressing is initiated and completed before the heating is commenced.